Patented Mar. 3, 1942

2,275,125

UNITED STATES PATENT OFFICE 2,275,125

N-CYCLOHEXYL SULPHAMIC ACID AND SALTS

Ludwig F. Audrieth, Champaign, Ill., and Michael Sveda, Cleveland, Ohio, assignors to E. I. du Pont de Nemours & Company, Wilmington, Del., a corporation of Delaware No Drawing. Application August 4, 1940, Serial No. 351,447

6 Claims. (Cl. 260—429)

This invention relates to N-substituted sulphamic acids and their salts, and is more particularly directed to products of the type

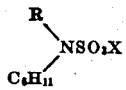

where R is selected from the group consisting of hydrogen, low molecular weight alkyl groups, and cyclohexylamine groups, and X is selected from the group consisting of hydrogen and cationic salt-forming groups, and is further directed to processes for producing such products which include the step of sulphonating a cyclohexylamine.

Substituted sulphamic acids having substituents of high molecular weight, that is, having more than eight carbon atoms, have already been prepared, but the properties of such products differ radically from the properties of the cyclohexyl-substituted sulphamic acids of the present invention.

Now we have found that N-substituted sulphamic acids and their salts, having cyclohexyl groups in place of at least one of the amino hydrogen atoms of sulphamic acid, have unusual and useful properties. We have further found that such N-substituted acids may advantageously be prepared by processes which include the step of sulphonating a cyclohexylamine.

Sulphamic acid may be represented structurally by the formula:

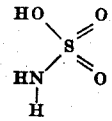

The hydrogen atoms directly attached to the nitrogen are herein referred to as "amino hydrogens", and substitution of other groups for these hydrogens give products referred to as "N-substituted" sulphamic acids. The compositions of our invention include N-substituted sulphamic acids and sulphamates of the general type

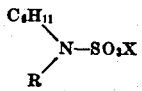

where R is hydrogen, a low molecular weight alkyl group, or another cyclohexyl group, $C_6H_{11}$, and X is hydrogen or a cationic salt-forming group.

Compositions of our invention which are mono-N-substituted with the cyclohexyl group, $C_6H_{11}NHSO_3X$ are novel and useful sweetening agents, sodium cyclohexyl sulphamate, for instance, being easily detectable by taste in a dilution of 1 part in 10,000 parts of water. By contrast, ordinary cane sugar cannot be detected beyond a dilution of 1 part in 140 parts of water. This sweetness of mono-N-substituted cyclohexyl sulphamic acids and sulphamates is the more remarkable because even at very high concentrations it is not accompanied by the bitterness often associated with other extremely sweet substances such as saccharine.

In addition to having a sweet taste the mono-cyclohexyl sulphamates have marked bactericidal and germicidal action. The silver salt in particular is a powerful bactericide and germicide. The sweetness of this salt makes it especially valuable as an oral antiseptic since, unlike many valuable germicides, it is pleasing rather than repugnant to the taste.

Compositions of our invention which are di-N-substituted with the cyclohexyl group,

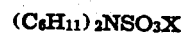

are effective pesticides on such types of organisms as insects. Cadmium dicyclohexyl sulphamate, for instance, is remarkably toxic to Mexican bean beetle larvae.

The nature of our novel compositions and processes will be better understood by reference to the following examples which are given to illustrate but not to limit the invention. Example I illustrates the preparation of cyclohexyl sulphamic acid by a process of our invention.

Example I

Cyclohexylamine was first sulphonated by dissolving 148.5 parts by weight of the cyclohexylamine in 2240 parts by weight of carbon tetrachloride, cooling the solution to 5° C. and slowly adding 58.3 parts of chlorosulphonic acid while maintaining the temperature of the mixture at about 5° C. A precipitate comprising the cyclohexylammonium salt of cyclohexylamine N-substituted sulphamic acid was filtered off and treated with a solution of 180 parts of barium hydroxide octahydrate dissolved in 1100 parts by weight of water. This solution was then evaporated to dryness, whereby barium replaced the cationic cyclohexylamine of the product, the liberated cyclohexylamine being evaporated off. The dry mass was redissolved in water, excess barium was removed by passing carbon dioxide through the solution and filtering, and barium cyclohexyl N-substituted sulphamate was obtained by crystallization. A suspension of 4.364 parts by weight of this barium salt, $Ba(C_6H_{11}NHSO_3)_2 \cdot 1.5H_2O$ in 50 parts of water was treated with 33.4 parts of 0.505N sulphuric acid, and the barium sulphate thus precipitated was filtered off. From the filtrate, cyclohexyl sulphamic acid, $C_6H_{11}NHSO_3H$, was obtained by crystallization.

The free acid was found to have a lemon-sour sweetness even at high dilutions.

Salts of cyclohexyl sulphamic acid may be prepared by neutralizing the free acid with a base of the desired cation. The isolation of the free acid is not essential, however, since metathetical reactions are possible with the sulphonation products of cyclohexylamine. Example II shows a metathetical reaction of this type to give sodium cyclohexyl sulphamate.

Example II

Cyclohexylamine was sulphonated by dissolving 148.5 parts by weight of the cyclohexylamine in 2240 parts by weight of carbon tetrachloride, cooling the solution to 5° C., and slowly adding 58.3 parts of chlorosulphonic acid while maintaining the temperature of the mixture at about 5° C., whereby the cyclohexylammonium salt of cyclohexylamine N-substituted sulphamic acid was formed. This precipitate was filtered off and dissolved in 850 parts by weight of water containing 46.3 parts of sodium hydroxide and the entire mass was evaporated to dryness, whereby sodium replaced the cationic cyclohexylamine of the product, the liberated cyclohexylamine being evaporated off. The dry residue was dissolved in a minimum of water and sodium cyclohexyl sulphamate, $C_6H_{11}NHSO_3Na$ was recrystallized from the solution by cooling.

The sodium cyclohexyl sulphamate thus prepared was found to be extremely sweet to the taste, being easily detectable in a dilution of 1 part in 10,000 parts of water. Moreover, crystals of sodium cyclohexyl sulphamate were pleasantly sweet even when placed directly on the tongue.

Other useful cyclohexyl sulphamic salts may likewise be prepared by sulphonating cyclohexylamine and treating the product with a compound or sequence of compounds containing the desired cation. Example III, for instance, shows the preparation of silver cyclohexylamine.

Example III

By the method shown in Example II, above, sodium cyclohexyl sulphamate was prepared by sulphonating 148.5 parts of cyclohexylamine dissolved in 2240 parts of carbon tetrachloride with 58.3 parts of chlorosulphonic acid at 5° C. and treating the resultant precipitate with 46.3 parts of sodium hydroxide dissolved in 850 parts of water, followed by evaporation of the liberated cyclohexylamine. To 13.4 parts by weight of sodium cyclohexyl sulphamate prepared in this manner and dissolved in 600 parts of water, there was added 19 parts of silver nitrate in 150 parts of water. The resulting solution was heated to boiling and filtered while hot. By concentrating the filtrate, silver cyclohexyl sulphamate, $C_6H_{11}NHSO_3Ag$, was crystallizd out.

In common with other mono-N-substituted sulphamates, the silver salt was found to be sweet to the taste. Additionally, it was found by biological tests to possess powerful bactericidal properties.

By processes similar to those shown in the foregoing examples, the cyclohexyl sulphamates of a desired cation may be produced. Thus, by sulphonating cyclohexylamine and treating the sulphonation product with barium hydroxide, the barium salts can be obtained and from the barium salt there can be produced the cyclohexyl sulphamates of other cations by double decomposition with the sulphate of the cation. For instance, zinc cyclohexyl sulphamate can be made by treating the barium salt with zinc sulphate or the ammonium salt may be produced by treating the barium salt with ammonium sulphate.

In addition to the metal salts of cyclohexyl sulphamic acids, the salts of organic bases may also be prepared by processes of our invention. For instance, the mono-N-substituted cyclohexyl sulphamates of such organic bases as amines and alkaloids can be produced and such compositions are of therapeutic value because the normal bitterness of the organic base is offset by the sweetness of the cyclohexyl sulphamic anion. Thus, such therapeutically valuable amines as ephedrine are made more pleasant for oral or nasal applications by conversion to their cyclohexyl sulphamate salts.

By using a suitable proportion of dicyclohexylamine with a sulphonating agent, a di-substituted cyclohexyl sulphamic acid may be prepared in accordance with a process of our invention. The preparation of di-cyclohexyl sulphamic acid is illustrated in Example IV.

Example IV

Cylclohexylamine was sulphonated by dissolving 252 parts by weight of the di-cyclohexylamine in 2240 parts of carbon tetrachloride and slowly adding 58.3 parts of chlorosulphonic acid while stirring the mixture vigorously and maintaining the temperature at 5° C. by cooling. The reaction mass was treated with a solution of 50 parts of sodium hydroxide in 2000 parts of water and this mixture was heated and stirred vigorously. Carbon tetrachloride, which separated from the aqueous layer, was drawn off and the aqueous solution was then acidified with hydrochloric acid. Free di-cyclohexyl sulphamic acid was thus precipitated and was recovered by filtration.

By processes analogous to that of Example IV, including the step of sulphonating di-cyclohexylamine, salts of di-cyclohexyl sulphamic acid may be produced. Example V illustrates the preparation of sodium di-cyclohexyl sulphamate in this manner.

Example V

In 150 parts by weight of chloroform there was dissolved 54.4 parts of di-cyclohexylamine and sulphonation was effected by slowly adding 11.7 parts of chlorosulphonic acid while vigorously stirring the mixture and maintaining the temperature at 5° C. The reaction mass obtained was then added to a solution of 8 parts of sodium hydroxide in 500 parts of water, whereby sodium replaced di-cyclohexylamine in the cation of the product. The di-cyclohexylamine thus liberated was separated off and sodium di-cyclohexyl sulphamate was obtained by crystallization from the resultant liquor.

By procedures similar to those already described for the preparation of mono-cyclohexyl sulphamates, involving as the first step the sulphonation of a cyclohexylamine, the di-cyclohexyl sulphamates may be prepared. The preparation of cadmium di-cyclohexyl sulphamate, for instance, is illustrated in Example VI.

Example VI

Di-cyclohexyl sulphamic acid was prepared by sulphonation of di-cyclohexylamine as described in Example IV. Forty parts by weight of di-cyclohexyl sulphamic acid was dissolved in 1500 parts of water containing just enough sodium hydroxide to effect the dissolution. The solution was heated to boiling and a solution of 17 parts of cadmium sulphate, $CdSO_4 \cdot 8/3H_2O$, in 300 parts of water was added with stirring. A precipitate of cadmium di-cyclohexyl sulphamate was formed and was recovered by filtration.

Experimental tests showed that cadmium di-cyclohexyl sulphamate prepared as in Example VI was highly toxic to the larvae of the Mexican bean beetle.

By procedures analogous to those of Examples IV to VI, above, the di-cyclohexyl sulphamates of various metals, such as for instance, barium, zinc, and copper, were prepared by first sulphonating di-cyclohexylamine and then suitably treating the reaction product with a compound of the desired metal.

Sulphamic acids and sulphamates which are N-substituted with both cyclohexylamine and low molecular weight alkyl groups may also be prepared according to processes of our invention. Example VII illustrates the preparation of such a composition, viz., sodium cyclohexyl (methyl) sulphamate.

Example VII

A solution of 17 parts of cyclohexyl (methyl) amine in 150 parts of chloroform was cooled to 0° and sulphonated by slowly adding 5.9 parts of chlorosulphonic acid. The solvent chloroform was then removed by evaporation and the residue was dissolved in 5 parts of sodium hydroxide dissolved in 200 parts of water. Cyclohexyl (methyl) amine liberated by the sodium hydroxide was removed by ether extraction and sodium cyclohexyl (methyl) sulphamate was recovered by crystallization from the aqueous solution.

If other cyclohexyl (alkyl) amines, such as cyclohexyl (ethyl) amine or cyclohexyl (propyl) amine are used according to the procedure of Example VII, the corresponding cyclohexyl alkyl sulphamic acid or sulphamate is obtained upon sulphonation in accordance with the processes of our invention. It will be understood that the term "cyclohexylamine" as used generically in this application includes both mono and di-cyclohexylamines and alki-substituted cyclohexylamines such as methyl cyclohexylamine and also such as cyclohexyl alkyl amines as those above described.

The sulphonation of a cyclohexyl amine in accordance with a process of our invention may be carried out with a variety of sulphonating agents. In place of the chlorosulphonic acid shown in the foregoing examples, we may use such agents as metallic chlorosulphonates, sulphur trioxide, pyridine-sulphur trioxide addition compounds, dioxane-sulphur trioxide addition compounds, and ethyl chlorosulphonate.

It is preferable to carry out the sulphonation in solution in an inert solvent. In place of the carbon tetrachloride and chloroform used in the foregoing examples, such solvents as ether, benzene, toluene, xylene, petroleum ether, and tetrachlorethane may be used. The pyridine-sulphur trioxide addition compound can be used even in cold aqueous solutions.

The proportion of cyclohexylamine which we prefer to use in preparing the compositions of our invention depends to some extent upon the sulphonating agent used. For instance, with chlorosulphonic acid as the sulphonating agent, we prefer to use about 3 mols of cyclohexylamine to 1 mol of chlorosulphonic acid, less amine resulting in decreased yields and more being of no value and present merely as excess. With sulphur trioxide as the sulphonating agent, we prefer to use about 2 mols of amine per mol of sulphur trioxide. The proportions of cyclohexylamine used with other sulphonating agents are in the same order of magnitude as for chlorosulphonic acid or sulphur trioxide, the preferred amounts to use being readily determinable in each case from a consideration of the nature of the sulphonating agent or by a few simple experiments.

In carrying out the sulphonation reaction, it is usually preferred to cool the reaction mixture as shown in the foregoing examples, since improved yields are thereby obtained. Temperatures in the order of 5° C. to give satisfactory results but higher or lower temperatures may be employed if desired. In most instances, however, better results are obtained if the temperature of the reaction mixture is not permitted to exceed about 30° C.

While in the foregoing description we have shown certain specific processes and products, it will be understood that those skilled in the art, without departing from the scope of our invention, may employ various processes and produce various products.

We claim:

1. A composition of the type

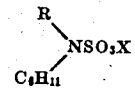

where R is selected from the group consisting of hydrogen, low molecular weight alkyl groups, and cyclohexyl groups, and X is selected from the group consisting of hydrogen and cationic salt-forming groups.

2. An N-cyclohexyl sulphamic acid.
3. A salt of an N-cyclohexyl sulphamic acid.
4. Sodium cyclohexyl sulphamate.
5. Cadmium dicyclohexyl sulphamate.
6. Silver cyclohexyl sulphamate.

LUDWIG F. AUDRIETH.
MICHAEL SVEDA.